(12) United States Patent
Vogel et al.

(10) Patent No.: US 7,862,440 B2
(45) Date of Patent: Jan. 4, 2011

(54) NUT ASSEMBLY AND METHOD FOR THE PRODUCTION THEREOF

(75) Inventors: Manfred Vogel, Kappelrodeck (DE); Ewald Baechle, Hausach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 666 days.

(21) Appl. No.: 11/547,674

(22) PCT Filed: Apr. 6, 2005

(86) PCT No.: PCT/DE2005/000612

§ 371 (c)(1),
(2), (4) Date: Jul. 24, 2007

(87) PCT Pub. No.: WO2005/098246

PCT Pub. Date: Oct. 20, 2005

(65) Prior Publication Data

US 2008/0022505 A1  Jan. 31, 2008

(30) Foreign Application Priority Data

Apr. 7, 2004 (DE) .................. 10 2004 016 979

(51) Int. Cl.
*B21K 1/44* (2006.01)
*B23G 5/00* (2006.01)
*B21D 53/24* (2006.01)

(52) U.S. Cl. ................. 470/25; 470/2; 470/18

(58) Field of Classification Search .............. 470/2, 470/3, 5, 25, 26, 41, 18–21, 42, 48, 49, 51, 470/87, 88, 162, 163; 411/427, 432, 435, 411/533

See application file for complete search history.

(56) References Cited

U.S. PATENT DOCUMENTS

| | | | |
|---|---|---|---|
| 1,989,750 A * | 2/1935 | Garrett | 470/42 |
| 4,040,462 A * | 8/1977 | Hattan | 470/19 |
| 5,871,402 A | 2/1999 | Baechle | |
| 5,938,420 A | 8/1999 | Teraoka | |
| 6,213,885 B1 | 4/2001 | Baechle | |
| 6,843,631 B2 | 1/2005 | Winker | |

FOREIGN PATENT DOCUMENTS

| | | |
|---|---|---|
| DE | 43 07 090 A1 | 10/1993 |
| DE | 196 50 453 A1 | 6/1997 |
| DE | 197 11 287 C2 | 11/1997 |
| DE | 199 56 287 A1 | 5/2001 |
| DE | 100 54 896 A1 | 5/2002 |
| DE | 102 23 713 A1 | 2/2003 |

* cited by examiner

OTHER PUBLICATIONS

German Office Action dated Nov. 4, 2004 (five (5) pages).

*Primary Examiner*—Teresa M Bonk
(74) *Attorney, Agent, or Firm*—Crowell & Moring LLP

(57) ABSTRACT

The invention relates to both nut assemblies and methods for producing the same. Said nut assemblies consist of a nut body (1a) and a pressure disk (2a). The nut body has a drive portion, such as a polygonal portion, for engaging with a tool and an abutment region that can be brought into contact with the supporting surface of the pressure disk arranged on the nut body in a captive manner. The pressure disk has a central opening into which a neck formed on the nut extends axially at least in part. The neck has a projection for forming a captive connection. This projection radially overlaps or engages the thrust ring.

10 Claims, 4 Drawing Sheets

NUT ASSEMBLY AND METHOD FOR THE PRODUCTION THEREOF

The invention relates to both nut assemblies and methods for producing the same. The nut assemblies consist of a nut body and a pressure disk. The nut body has a drive portion, e.g., a polygonal portion, for engagement with a tool and an abutment region, which can be brought into contact with the supporting surface of the pressure disk arranged captively on the nut body when the nut is tightened. The pressure disk has a central opening into which a neck integrally formed on the nut body extends axially at least in part. The neck has a projection for forming a captive connection, which projection partially radially overlaps or engages the thrust ring.

In this type of nut assemblies, disclosed, for example, in German Laid Open Publications DE-OS 43 07 090 and 196 50 453 and used particularly to fix wheels or rims to the axles of motor vehicles, especially commercial vehicles, the pressure disk, is produced by cold forming, subsequent turning and then hardening and tempering prior to assembly with the nut body. The nut body itself has a hexagonal drive portion, as specified in the DIN standard for nuts.

One object of the present invention is to make the nut assemblies cheaper to manufacture, to reduce and optimize the number of manufacturing steps and, in addition, to reduce the use of material. A further object is to increase the transmittable torques while at the same time maintaining or improving the other essential performance characteristics.

According to the invention, this object is attained at least in part by eliminating the cold forming, turning and hardening and tempering in the manufacture of the pressure disk and instead bringing the pressure disk into its final form by a single forming process prior to assembly with the nut body. According to another feature of the invention, the forming process is a hot pressing process, which can be carried out in a progressive die. The hot pressing process according to the present invention is further characterized in that it includes only a single heating process. It can be particularly advantageous if cooling of the pressure disk after hot forming is defined or controlled, so that the pressure disk is cooled according to a specified time/temperature profile. This makes it possible to produce a microstructure of the pressure disk that is comparable to that obtained by a separate heat treatment, such as "hardening and tempering," by simultaneous cooling from the heating temperature used in the forming process.

In a manufacturing process of this type, particularly when the process according to the present invention is used to produce a pressure disk, it is possible not only to eliminate cold forming and turning but also hardening and tempering, which provides substantial cost savings overall compared to conventional manufacturing processes. Defined cooling may be accomplished by air and/or at least a partial use of a liquid medium.

Defined cooling imparts properties similar to those obtained by hardening and tempering, i.e., material strength comparable to the tempering strength of the conventional production method, which includes a separate hardening and tempering process, as well as the corresponding microstructure. These properties, which are at least approximately equivalent to hardening and tempering, are thus not achieved by an additional heating process but during cooling from a hot forming process, which is required for shaping in any case. As already mentioned, the nut assembly according to the invention is characterized in that it is not cold-formed, not machined in a chip removing process and not subjected to a separate tempering process.

Thus, according to the invention, after a heating process, the following contours of the pressure disk:
- outside diameter,
- the abutment region facing away from the nut body; this region may also be concave and serves to contact the rim,
- the central opening, including the contour thereof; the contour serves to hold the pressure disk on the nut and may be radially expanded, e.g., conically flared, toward the abutment region of the pressure disk or may be formed as an undercut,
- the supporting surface provided for contacting the nut body; the supporting surface may be conical—convex—and the conicity thereof may be steeper than that of the abutment region,
- the junction area between the supporting surface and the outside diameter, are obtained in a single forming process, i.e., by means of a single heating step, in a progressive die, and defined cooling achieves properties comparable to those obtained by hardening and tempering.

It may be particularly advantageous if the pressure disk is made of steel with a higher carbon content than the 34 $CrMo_4$ conventionally used for such pressure disks, i.e., 42 $CrMo_4$, for example, which is not much more expensive than the former.

According to other features of the invention, nut assemblies can be improved and at least some of the aforementioned objects of the invention attained, i.e., for example, increasing the transmittable torques, obtaining a more uniform contact pattern as the nut is tightened and improving moment distribution, e.g., by distributing the material more uniformly across the polygon. Costs may also be reduced by reducing the use of material.

According to advantageous further refinements of the invention, such nut assemblies can have fewer than six, six or more than six force application elements, such as application projections or surfaces. However, if the drive portion, i.e., the nut body, has six force application elements, these elements differ, according to one inventive feature, from a standard hexagon specified by DIN for such nuts. Regardless whether fewer than six, six or more than six force application elements are used, it may be advantageous if the drive portion is a round external profile, e.g., a hexagonal, octagonal or some other round external profile. These round external profiles of the nut member may also take the form of a Torx® profile or a Torx®-like profile. Torx® profiles or Torx®-like profiles have thus far been used only in combination with screws, i.e., with internal or external profiles on the screw heads. The invention therefore also relates to nuts with a round external profile, e.g., a Torx® or Torx®-like profile, in general and nut assemblies in particular. Nuts according to the invention with a round external profile or a Torx® or Torx®-like profile are characterized in that they do not have straight sides connecting the individual axially extending corner edges but round edges with radial indentations or axially extending grooves therebetween. Compared to comparable polygonal profiles, these profiles offer substantially greater torque transmission, reduce the radial forces and improve the engagement of tools because the resulting contact pattern during tightening is substantially more uniform. This shape improves centering of the tool because e.g., all six elements are actually bearing elements. This is not the case in a standard hexagon configuration where the tool is usually centered along only two or three surfaces.

If, for instance, an octagonal round external profile is used instead of a hexagonal round external profile, it is possible not only to achieve the above-described advantages but also to save on the cost of material because in that case the outside diameter can be further reduced while maintaining at least approximately identical characteristics, since the ratio of outside diameter to inside diameter of the drive portion may be set at less than 1.3 according to the invention, e.g., between less than 1.3 and 1.18, so that even less material is required than for the standard comparable Torx®.

It may be particularly advantageous if a nut assembly, especially one of the above-described type, has a dodecagonal configuration.

The invention will now be described in greater detail with reference to FIG. 1 through 8, in which.

Figure 1:
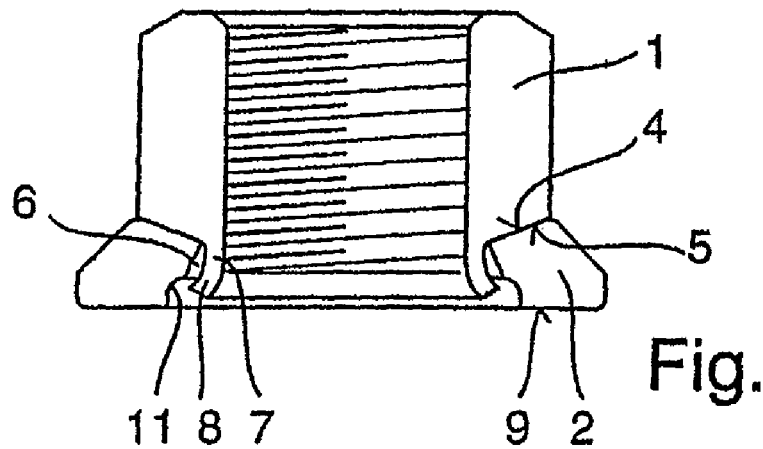
FIG. 1 is a sectional view of a nut assembly according to the prior art taken along line I-I of FIG. 2, which is a top view of the same nut assembly.
Figure 2:
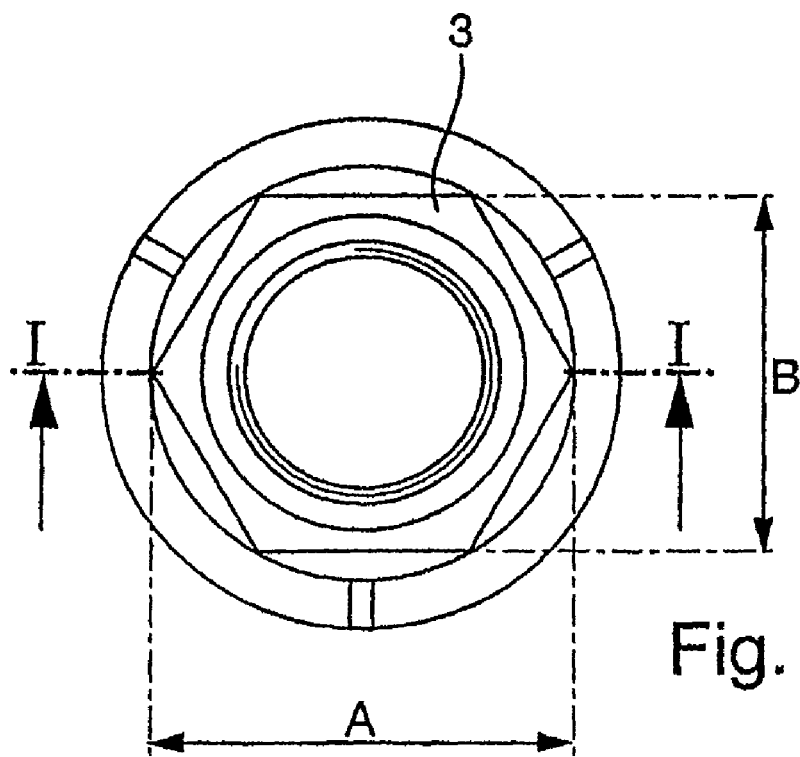

Conventional nut assemblies corresponding to FIGS. 1 and 2, which are also described in German Laid Open Publication 196 50 453, have a nut body 1 with a captive pressure member 2 attached thereto. The nut body has a drive portion configured as a hexagon 3 for engagement with a tool. The nut body 1 furthermore has an abutment surface 4, which is brought into contact with the supporting surface 5 of the captive pressure disk 2 on the nut body when the nut is tightened. This pressure disk has a central opening 6 into which a neck 7 integrally formed on the nut body extends axially, at least in part. To form a captive connection, the neck has a projection 8 in the form of an expansion 11, which partly radially overlaps or engages the thrust ring.

First, the pressure disk 2 is produced by cold forming prior to assembly with the nut body 1. Subsequently, at least the supporting surface 5 and the abutment region 9, with which the pressure disk contacts the rim, are turned. Finally, the pressure disk, which in the prior art consists of 34 CrMo$_4$, is hardened and tempered. After assembly of the pressure disk 2 and the nut body 1, the neck 8, which initially has a smaller diameter than the central opening, is widened radially outwardly and the pressure disk is thereby secured to the nut body.

Identical or equivalent parts or contours shown in FIG. 3 to 8 are provided with the same basic reference numerals.

The pressure disk 2a, 2b and 2c shown in FIG. 3 to 8 are formed of steel having a higher carbon content, preferably 42 CrMo$_4$, than the pressure disk according to the prior art depicted in FIGS. 1 and 2. These pressure disks 2a, 2b and 2c are brought into their final form using a single forming process, preferably a hot pressing process, and preferably in a progressive die. The hot pressing process includes a single heating step. After hot forming, the pressure disk is cooled in a defined or controlled manner according to a predetermined time-temperature profile. This defined cooling from the heating temperature used in the forming process produces a microstructure of the pressure disk which is comparable to that obtained by "hardening and tempering." This can be achieved by controlled cooling by air or by at least partial use of a liquid medium.

During the forming process, the present contours of the pressure disk, i.e., the outside diameter 10, the abutment region 9 facing away from the nut body, with which the pressure disk contacts the rim and which may also be conical, i.e., concave, the central opening 6 including its contour 11, which is radially expanded toward the abutment region 9 of the pressure disk 2 to hold the pressure disk on the nut, the supporting surface 5 provided for contact with the nut body, which is conical or convex and the conicity of which is steeper than the conicity that may be provided on the abutment region 9, the junction area between the supporting surface 5 and the outside diameter 10, are produced in a single forming process, i.e., by means of a single heating step, and in a progressive die. By defined cooling after or even in the forming die, it is possible to achieve performance characteristics that are comparable to those obtained by hardening and tempering.

Figure 3:
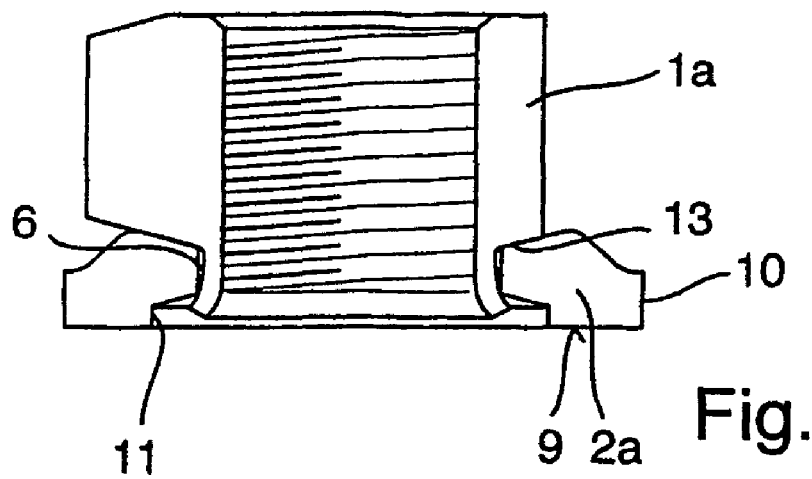
FIG. 3 is a sectional view of a nut assembly according to the invention taken along line III-III of FIG. 4, which latter is a top view of the same nut assembly.

According to a further refinement of the invention, for which FIG. 3 to 8 are shown as an example, the nut body 1 according to FIG. 3 is formed with six force application elements 12a in the form of a round external profile. This is a "Torx"®-type or a modified or similar profile.

Figure 4:
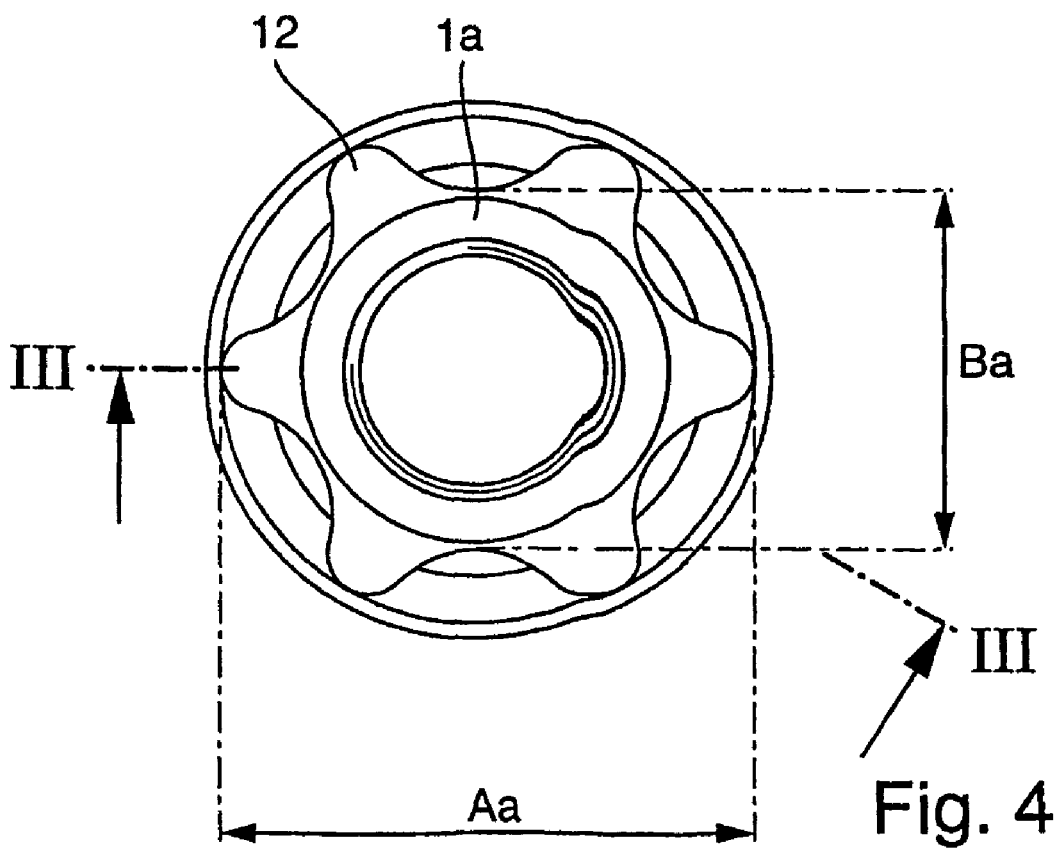
Figure 5:
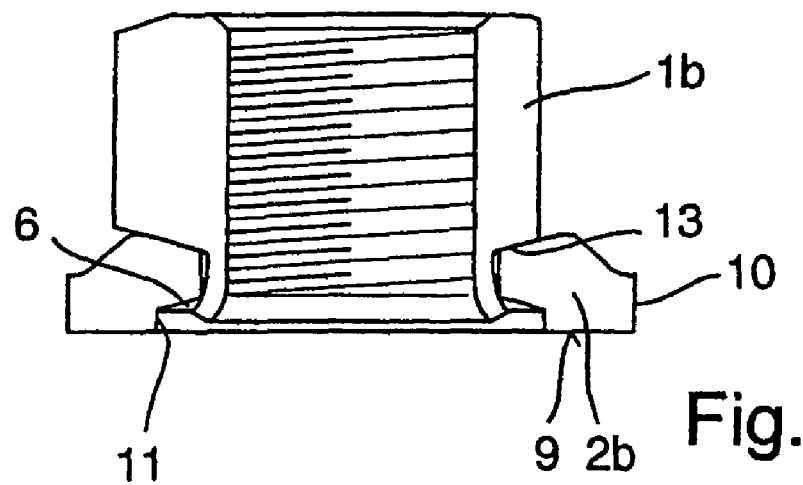
FIG. 5 illustrates another nut assembly according to the invention in a sectional view taken along line V-V of FIG. 6, which latter is a top view of the same nut.
Figure 6:
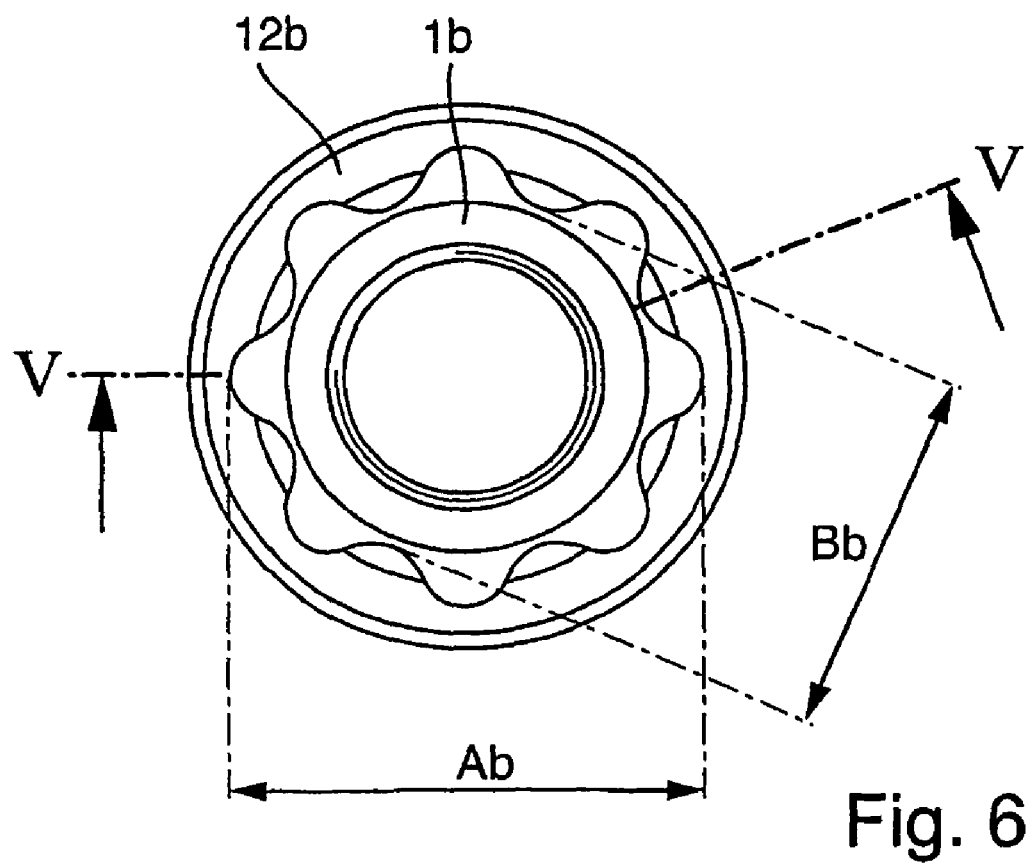

The nut body according to FIGS. 5 and 6 has eight force application elements 12b in the form of a round external profile. The ratio of outside diameter $A_b$ to core diameter $B_b$ is smaller than the ratio in the embodiment depicted in FIGS. 3 and 4, i.e., less than 1.3. In FIGS. 3 and 4, the ratio of outside diameter $A_a$ to core diameter $B_a$ is approximately 1.35.

Figure 7:
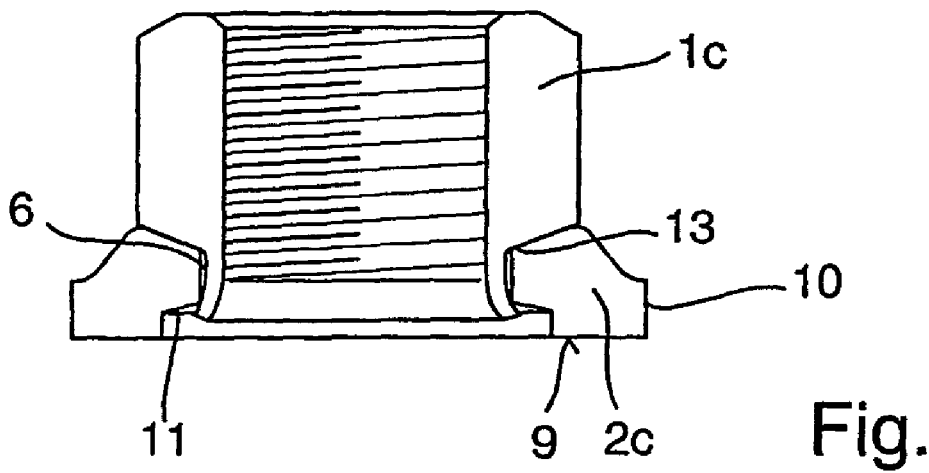
FIG. 7 shows another exemplary embodiment according to the invention in a sectional view taken along line VII-VII of FIG. 8, which is another top view.
Figure 8:
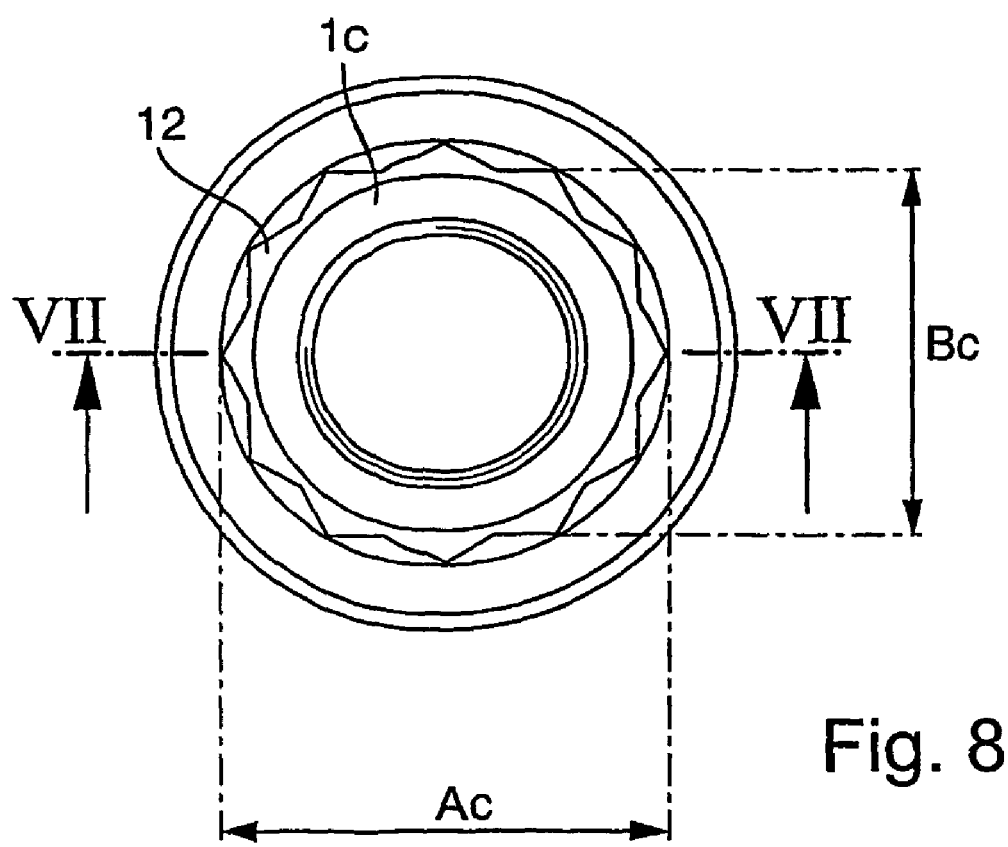

In FIGS. 7 and 8 the force application elements 12c are configured as a dodecagon and the ratio of outside diameter $A_c$ to core diameter $B_c$ is less than 1.2.

In a further step according to the invention, prior to assembly with the nut body the pressure disk is calibrated in a tool, or directly in front of an assembly tool, at least along edge 13 of the central opening which could come into contact with the nut body when the nut is tightened, but at least a bur that may have been created there is deformed.

The invention claimed is:

1. A method of producing a nut assembly comprising a nut and a pressure plate non-releasably connected to each other so as to be rotatable relative to each other;
   said nut comprising:
   a drive portion for engaging a tool,
   a contact region for engaging the pressure plate, and
   an axially extending integral neck;
   said pressure plate comprising:
   an annular pressure plate body having an outer diameter and a central aperture into which the axially extending neck of the nut extends at least partially such that an extension of the neck partially overlaps or engages behind the pressure plate to form the non-releasable connection between the nut and the pressure plate,
   a felly contact region facing away from the nut,
   a contour which is radially expanded toward the felly contact region for mounting the pressure plate on the nut,
   a support surface provided for engaging the contact region of the nut, and
   a transition region between the support surface and the outer diameter;
said method comprising forming the annular body, the outer diameter, the central aperture, the felly contact region, the radially expanded contour, the support surface, and the transition region of the pressure plate to final form in a single forming operation before assembly with the nut, wherein said single forming operation is a warm pressing operation which takes place in a multi-step sequence tool and includes a one-time heating process.

2. A method according to claim 1, characterized in that a cooling of the pressure plate after the warm forming operation takes place in a controlled manner.

3. A method according to claim 2, characterized in that the cooling of the pressure plate takes place in a prescribed time-temperature matrix.

4. A method according to claim 2, characterized in that a structure of the pressure plate corresponding to a separate heat treatment, such as tempering, is produced by controlled cooling from the heating utilized in the forming operation.

5. A method according to claim 2, characterized in that the cooling is effected by means of air.

6. Method according to claim 2, characterized in that the cooling is effected under at least partial use of a liquid medium.

7. A method according to claim 1, wherein the felly contact region of the pressure plate has a concave contour.

8. A method according to claim 1, wherein the support surface of the pressure plate has a conically convex contour.

9. A method according to claim 8, wherein the support surface of the pressure plate has a steeper conical contour than the contact region.

10. A method according to claim 1, wherein the drive portion of said nut comprises a polygonal body.

* * * * *